(12) United States Patent
Nakamura et al.

(10) Patent No.: US 8,913,313 B2
(45) Date of Patent: Dec. 16, 2014

(54) SCANNING OPTICAL APPARATUS

(71) Applicant: Brother Kogyo Kabushiki Kaisha, Nagoya-shi, Aichi-ken (JP)

(72) Inventors: Yoshifumi Nakamura, Nagoya (JP); Hitoshi Fujino, Tajimi (JP); Hidetaka Hoshino, Aichi-ken (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 21 days.

(21) Appl. No.: 13/625,605

(22) Filed: Sep. 24, 2012

(65) Prior Publication Data

US 2013/0077144 A1 Mar. 28, 2013

(30) Foreign Application Priority Data

Sep. 27, 2011 (JP) ................. 2011-210944

(51) Int. Cl.
*G02B 26/08* (2006.01)
*G02B 27/00* (2006.01)
*G02B 26/12* (2006.01)

(52) U.S. Cl.
CPC .......... *G02B 26/124* (2013.01); *G02B 27/0037* (2013.01)
USPC .................................. 359/196.1; 359/216.1

(58) Field of Classification Search
CPC ............. G02B 26/124; G02B 27/0037; G02B 27/4227; G02B 27/4283
See application file for complete search history.

(56) References Cited

U.S. PATENT DOCUMENTS

2008/0068689 A1* 3/2008 Saisho et al. ................... 359/204
2011/0228368 A1* 9/2011 Sakai et al. ................ 359/204.1

FOREIGN PATENT DOCUMENTS

JP 2006-154701 A 6/2006
JP 2006-154748 A 6/2006

* cited by examiner

*Primary Examiner* — James Phan
(74) *Attorney, Agent, or Firm* — Merchant & Gould PC

(57) ABSTRACT

A scanning optical apparatus includes: a light source; a light deflector configured to deflect the light beam from the light source in a main scanning direction; an incident optical system disposed between the light source and the light deflector and configured to render the light beam from the light source nearly parallel in the main scanning direction and to converge the light beam in a sub-scanning direction to bring the light beam to a focus in proximity to the light deflector; and a scanning lens configured to focus the light beam deflected by the light deflector onto a target surface to form spot-like images. The incident optical system includes one or more lenses which provide at least one refracting surface and at least one diffraction surface, and $\phi nS/\phi dS < 0$ is satisfied, where $\phi nS$ is a refractive power in the sub-scanning direction and $\phi dS$ is a diffraction power in the sub-scanning direction.

8 Claims, 4 Drawing Sheets

| | | RADIUS OF CURVATURE[mm] | DISTANCE[mm] | | REFRACTIVE INDEX |
|---|---|---|---|---|---|
| LIGHT SOURCE | | − | d1 = | 18 | − |
| COUPLING LENS | R1 | ∞ | d2 = | 2.1 | 1.52685 |
| | R2 | 17.971 | d3 = | 10 | − |
| CYLINDRICAL LENS | R21x | 19.419 | d4 = | 1.8 | 1.48546 |
| | R21y | ∞ | | | |
| | R22 | ∞ | d5 = | 41.187 | − |
| POLYGON MIRROR | − | ∞ | d6 = | 26 | − |
| F-THETA LENS | R31y | 63.205 | d7 = | 11 | 1.52685 |
| | R31x | −12.215 | | − | |
| | R32y | 222.148 | d8 = | 108.5 | |
| | R32x | −8.755 | | − | |
| TARGET SURFACE | | | | | |

SCANNING OPTICAL APPARATUS

CROSS-REFERENCE TO RELATED APPLICATION(S)

This application claims priority from Japanese Patent Application No. 2011-210944 filed on Sep. 27, 2011, the disclosure of which is incorporated herein by reference in its entirety.

TECHNICAL FIELD

The present invention relates to a scanning optical apparatus used for an electrophotographic image forming apparatus.

BACKGROUND ART

In a scanning optical apparatus used for an electrophotographic image forming apparatus, a light beam emitted from a light source is converted into a spot-like image and focused on a target surface to be scanned, such as a peripheral surface of a photoconductor drum. The light beam rapidly sweeps the surface of the photoconductor drum in an axial direction (main scanning direction) thereof. The scanning optical apparatus includes a light deflector for deflecting the light beam in the main scanning direction. The scanning optical apparatus further includes an incident optical system located upstream of the light deflector, and a scanning optical system located downstream of the light deflector. The incident optical system converges the light beam in the sub-scanning direction to bring the same to a focus in the proximity of the light deflector while rendering the light beam nearly parallel in the main scanning direction. Meanwhile, the scanning optical system focuses the light beam deflected by the light deflector onto the target surface to form a spot-like image.

However, if the environmental temperature at which the scanning optical system is used varies, dimensions of parts or performances of optical elements will change, with the result that the focal point shifts (i.e., focus movement occurs) in the front-and-rear direction (in the traveling direction of the light beam) from the target surface. This is particularly serious if a plastic lens is used in the incident optical system for the purpose of reducing the manufacturing cost.

To address this problem, a conventional scanning optical apparatus includes an incident optical system provided with a refracting unit (refracting surface) and a diffraction unit (diffraction surface) so that a focus movement (i.e., focal plane shift) caused by temperature change can be suppressed (temperature change can be compensated). Further, it is known that satisfying the following conditions is preferable to suppress the focus movement: a power of the refraction unit is $\phi r$, a power of the diffraction unit is $\phi d$, and $0.6 < \phi r / \phi d < 0.9$.

SUMMARY OF THE INVENTION

In recent years, there has been growing demand for reducing the size of an image forming apparatus. Therefore, it would be desirable to provide a scanning optical apparatus which can, while reducing the size thereof, perform a highly accurate exposure of the target surface taking into consideration the temperature compensation as described above.

The present invention has been made in consideration of the above background.

According to the present invention, there is provided a scanning optical apparatus, which comprises: a light source configured to emit a light beam; a light deflector configured to deflect the light beam from the light source in a main scanning direction; an incident optical system disposed between the light source and the light deflector and configured to render the light beam from the light source nearly parallel in the main scanning direction and to converge the light beam in a sub-scanning direction to bring the light beam to a focus in proximity to the light deflector; and a scanning lens configured to focus the light beam deflected by the light deflector onto a target surface to form spot-like images. The incident optical system comprises one or more lenses which provide at least one refracting surface and at least one diffraction surface, and $\phi nS/\phi dS<0$ is satisfied, where $\phi nS$ is a refractive power in the sub-scanning direction and $\phi dS$ is a diffraction power in the sub-scanning direction.

BRIEF DESCRIPTION OF THE DRAWINGS

To better understand the claimed invention, and to show how the same may be carried into effect, reference will now be made, by way of example only, to the accompanying drawings, in which:

DESCRIPTION OF EMBODIMENTS

With reference to the accompanying drawings, one exemplary embodiment of the present invention will be described.

Figure 1:
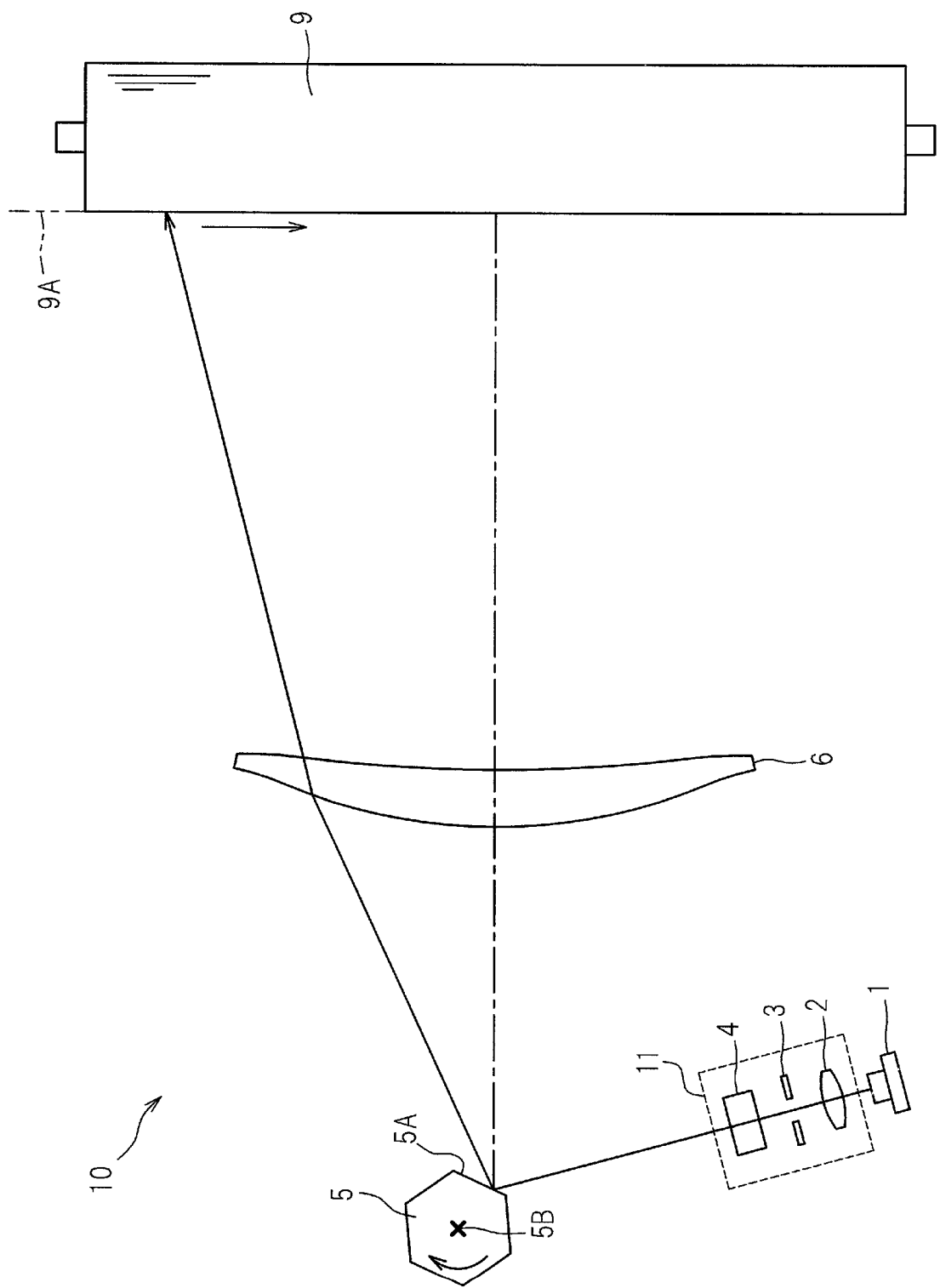
FIG. 1 is a sectional view of a scanning optical apparatus according to one exemplary embodiment taken along a plane parallel to a main scanning direction.

As seen in FIG. 1, a scanning optical apparatus 10 according to this embodiment includes a semiconductor laser 1 as an example of a light source, an incident optical system 11, a polygon mirror 5 as an example of a light deflector, and an f-theta lens (fθ lens) 6 as an example of a scanning lens. With these components, a laser beam emitted from the semiconductor laser 1 is condensed and focused into a spot on a target surface 9A of a photoconductor drum 9, and rapidly sweeps the target surface 9A. The semiconductor laser 1, the incident optical system 11, the polygon mirror 5 and the f-theta lens 6 are fixed to a casing (i.e., retaining member; not shown) at predetermined positions. The casing is made of resin (plastic) or metal.

The semiconductor laser 1 is configured to emit a slightly divergent laser beam (light beam). A light emitting element of the semiconductor laser 1 emits blinking light under control of a controller (not shown) and illuminates the target surface 9A of the photoconductor drum 9 with the blinking light in accordance with image data to be exposed.

The incident optical system 11 is disposed between the semiconductor laser 1 and the polygon mirror 5. The incident optical system 11 is an optical system configured to render the light beam emitted from the semiconductor laser 1 nearly parallel in a main scanning direction (i.e., direction of sweeping motion of the light beam which is deflected by the polygon mirror 5 and travels with its traveling direction changing to the left and to the right in the plane of the drawing sheet of FIG. 1) and to converge the light beam in a sub-scanning direction (i.e., direction orthogonal to the main scanning direction; direction extending orthogonal to the plane of the drawing sheet of FIG. 1) to bring it to a focus in proximity to a mirror surface 5A of the polygon mirror 5. In this exemplary embodiment, the incident optical system 11 includes a collimating lens 2, an aperture stop 3, and a cylindrical lens 4.

The collimating lens 2 is a lens configured to convert a slightly divergent laser beam emitted from the semiconductor laser 1 into a nearly parallel beam of light.

The aperture stop 3 is a member having an opening by which the size of the light beam having passed through the collimating lens 2 is determined.

The cylindrical lens 4 is a lens configured to convert the light beam having passed through the collimating lens 2 and the aperture stop 3 into a linear image extending in the main scanning direction to be formed in proximity to a mirror surface 5A of the polygon mirror 5.

Lens surfaces of the collimating lens 2 and the cylindrical lens 4 are configured such that one or more of the lens surfaces in the incident optical system 11 are reflecting surfaces and the remaining lens surfaces in the incident optical system 11 are diffraction surfaces. The refracting surfaces and the diffraction surfaces may be arbitrarily assigned in the incident optical system 11. However, at least one refracting surface and at least one diffraction surface are provided in the incident optical system 11. Although two lenses are provided in the incident optical system 11 in this embodiment, the incident optical system 11 may include only one lens having a refracting surface and a diffraction surface. Further, in terms of the manufacturing cost, it is preferable that the lens having a diffraction surface is made of resin, and the temperature compensation according to the present invention can be effectively utilized in such cases.

The incident optical system 11 is configured to satisfy the following conditions:

$$\phi nM/\phi dM > 0$$

$$\phi nS/\phi dS < 0$$

where $\phi nM$ is a refractive power in the main scanning direction and $\phi dM$ is a diffraction power in the main scanning direction, and $\phi nS$ is a refractive power in the sub-scanning direction and $\phi dS$ is a diffraction power in the sub-scanning direction.

In the above formulae, the symbol "M" is an abbreviation for the main scanning direction, and the symbol "S" is an abbreviation for the sub-scanning direction. Further, the refractive power indicates the total refractive power in the incident optical system 11, that is, the sum of refractive powers of the collimating lens 2 and the cylindrical lens 4. Similarly, the diffraction power indicates the total diffraction power in the incident optical system 11, that is, the sum of diffraction powers of the collimating lens 2 and the cylindrical lens 4.

The polygon mirror 5 has a plurality of mirror surfaces 5A disposed equidistantly from an axis of rotation 5B; the polygon mirror 5 shown in FIG. 1 has six mirror surfaces 5A. The polygon mirror 5 spins at a constant rotational speed around the axis of rotation 5B and reflects and deflects the light beam having passed through the aperture stop 3 in the main scanning direction.

The f-theta lens 6 is configured to convert the light beam having reflected and thus deflected by the polygon mirror 5 into spot-like images to be formed on the target surface 9A as well as to correct an optical face tangle error of the mirror surfaces 5A of the polygon mirror 5. According to this embodiment, the scanning optical system 10 includes only one f-theta lens 6. The f-theta lens 6 has f-theta characteristics such that the light beam deflected at a constant angular velocity by the polygon mirror 5 is converted into a light beam that scans the target surface 9A at a constant linear velocity.

With the configuration of the scanning optical apparatus 10 as described above, while the scanning optical apparatus 10 can be downsized, a focus movement (i.e., focal plane shift) caused by a change in environmental temperature can be reduced and the temperature change can be compensated. The following is an example intended to demonstrate the above advantageous effects.

Figures 2, 3:
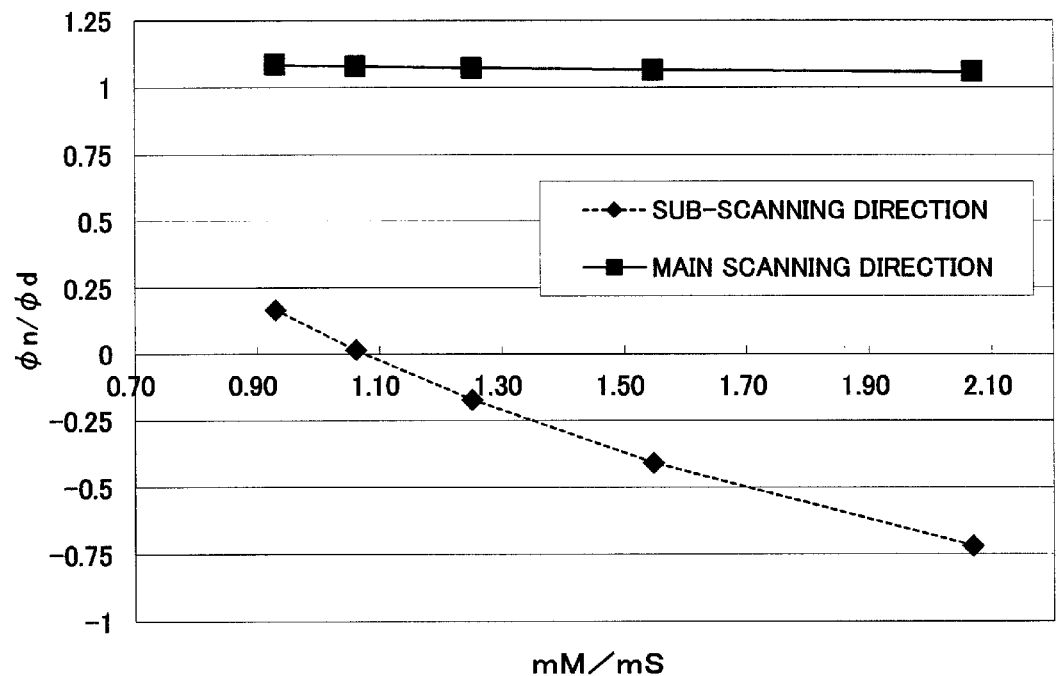
FIG. 2 is a graph showing the relationship between ratio of powers $\phi n/\phi d$ and ratios of magnifications mM/mS observed after temperature compensation.
FIG. 3 shows properties of the optical system.

FIG. 2 is a graph showing the relationship between the ratio of magnifications mM/mS and the ratio of powers $\phi n/\phi d$ (in the main scanning direction and the sub-scanning direction) in the scanning optical apparatus having the following optical properties (for details, see the list below in FIRST EXAMPLE); the graph was obtained by adjusting the values of the ratio of powers $\phi nM/\phi dM$ in the main scanning direction in the incident optical system 11 to minimize the amount of the focal plane shift in the main scanning direction as well as by similarly adjusting the values of the ratio of powers $\phi nS/\phi dS$ in the sub-scanning direction to minimize the amount of the focal plane shift in the sub-scanning direction. Herein, mM and mS represent a lateral magnification in the main scanning direction and a lateral magnification in the sub-scanning direction, respectively, in the entire optical system covering from the collimating lens 2 to the f-theta lens 6. Values of the ratio of magnifications mM/mS were adjusted by changing the radius of curvature of the cylindrical lens 4.

FIRST EXAMPLE

The following design conditions were used in this example.

| | |
|---|---:|
| Wavelength of semiconductor laser: | 788 [nm] |
| Temperature range: | From −5 to 55 [° C.] |
| Rate of change in wavelength of semiconductor laser | 0.25 [nm/° C.] |
| Coefficient of linear thermal expansion of a part for retaining the distance between the semiconductor laser and the incident optical system | $6.50 \times 10^{-5}$ [1/K] |
| Coefficient of linear thermal expansion of another part (casing) for retaining the optical system | $3.0 \times 10^{-5}$ [1/K] |
| Range of deflection angle | ±47.7 [°] |

FIG. 3 shows properties of the optical system in which the ratio of magnifications mM/mS is 1.25.

Figure 4:
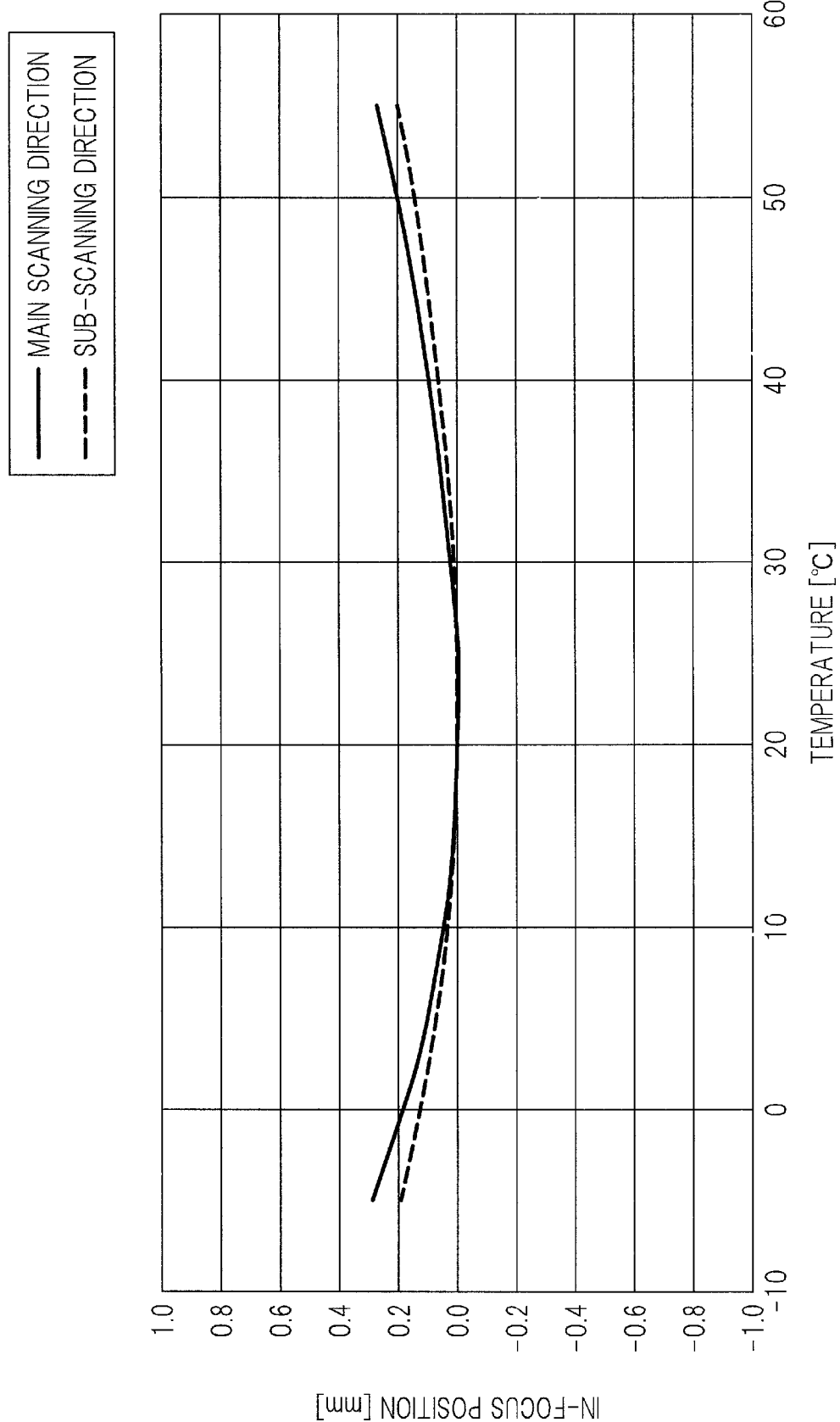
FIG. 4 is a graph showing the relationship between the amount of focal plane shift and temperature.

The ratio of powers $\phi nM/\phi dM$ in the main scanning direction and the ratio of powers $\phi nS/\phi dS$ in the sub-scanning direction were adjusted, and the obtained amounts of focal plane shift (i.e., amounts of shift in in-focus position) with respect to temperature change were plotted on a graph as shown in FIG. 4. Amounts of the focal plane shift in the main scanning direction (i.e., amounts of shift in in-focus position varying in the main scanning direction) were ranging from 0.265 to 0.284 mm at the temperature range of −5 to 55° C. with respect to the room temperature of 25° C. (reference temperature where no focal plane shift occurs) and amounts of the focal plane shift in the sub-scanning direction (i.e., amounts of shift in in-focus position varying in the sub-scanning direction) were ranging from 0.182 to 0.189 mm at the temperature range of −5 to 55° C. with respect to the room temperature (reference temperature). It is said that the smaller the amount of focal plane shift, the more robust is the scanning optical apparatus to environmental change. In general, it is preferable that the amount of focal plane shift is not greater than 1 mm. It can be seen that sufficient temperature compensation can be realized if the ratio of powers ϕn/ϕd is set as shown in FIG. 2.

Referring to FIG. 2, when the temperature change was compensated by adjusting the ratio of powers ϕn/ϕd, the values of the ratio of powers ϕn/ϕd in the main scanning direction were almost constant (about 1.1) irrespective of the ratio of magnifications mM/mS, while the values of the ratio of powers ϕn/ϕd in the sub-scanning direction showed tendency to decrease with increase in the ratio of magnifications mM/mS. To be more specific, the figure has shown that the values of the ratio of magnifications mM/mS are positive if the ratio of magnifications mM/mS is smaller than about 1.07 and negative if not smaller than about 1.07.

The ratio of magnifications mM/mS depends on the radius of curvature of the cylindrical lens 4. The distance from the cylindrical lens 4 to the polygon mirror 5 (light deflector) becomes shorter if the value of the ratio of magnifications mM/mS is greater, whereas the distance from the cylindrical lens 4 to the polygon mirror 5 (light deflector) becomes longer if this value is smaller. Accordingly, the greater the ratio of magnifications mM/mS, the more the scanning optical apparatus 10 can be downsized. This proves that if ϕnS/ϕdS<0 is satisfied, that is, if one of the refracting surface and the diffraction surface has a divergent power in the sub-scanning direction, the scanning optical apparatus 10 can be downsized while compensating for temperature change.

SECOND EXAMPLE

Figure 5:
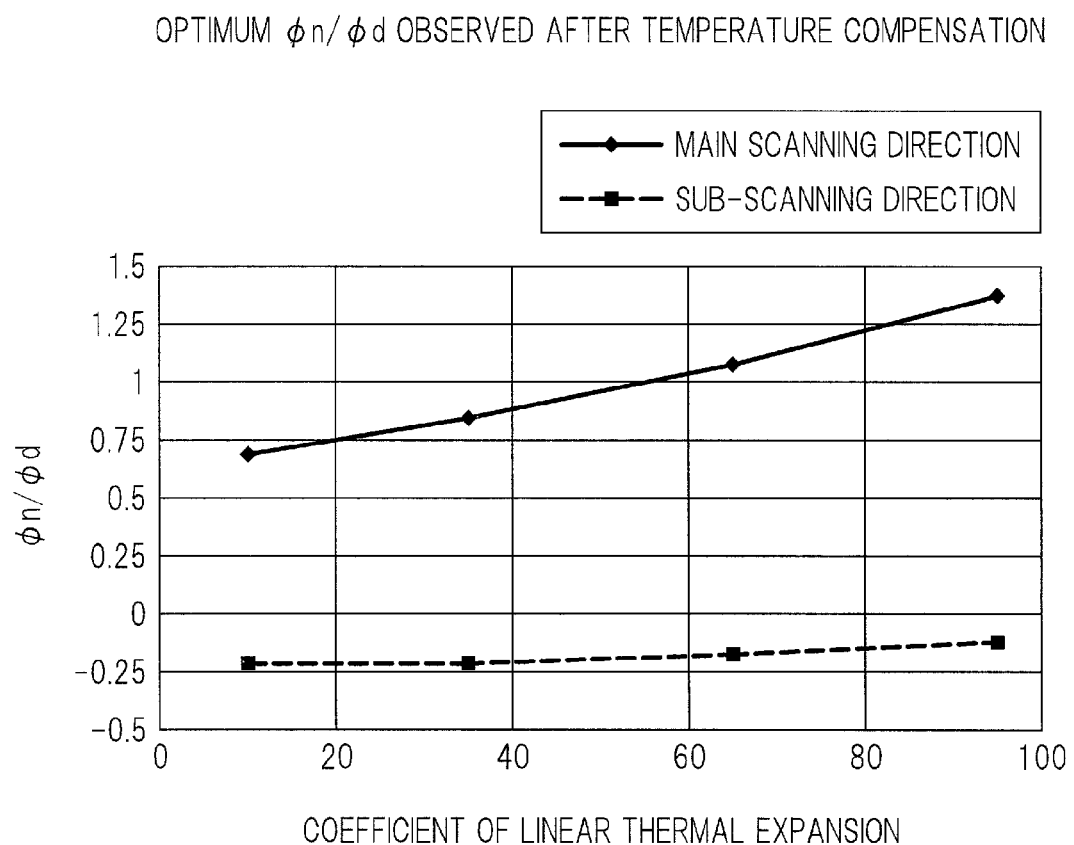
FIG. 5 is a graph showing the relationship between ratio of powers $\phi n/\phi d$ and coefficient of linear thermal expansion observed after temperature compensation.

FIG. 5 is a graph showing the optimum ratio of powers in the optical system of FIG. 3 in which the ratio of magnifications mM/mS is 1.25; values of the optimum ratio of powers were obtained by changing the coefficient of linear thermal expansion α for the part retaining the optical system.

As with the first example, the focal plane shift caused by temperature change were compensated in the main scanning direction as well as in the sub-scanning direction by adjusting the ratio of powers ϕnM/ϕdM in the main scanning direction and the ratio of powers ϕnS/ϕdS in the sub-scanning direction. Unlike the first example, the ratio of powers ϕnM/ϕdM in the main scanning direction varied to a large extent with respect to the change in the coefficient of linear thermal expansion α, whereas the ratio of powers ϕnS/ϕdS in the sub-scanning direction was substantially unchanged.

In this instance, the ratio of powers in the main scanning direction versus the coefficient of linear thermal expansion α can be represented by the following equation.

$$\phi nM/\phi dM = 3 \times 10^{-5}\alpha^2 + 0.005\alpha + 0.6364$$

Further, if the amount of shift was allowed in the range not greater than 1 mm, the allowable ϕnM/ϕdM can satisfy the following inequality.

$$3 \times 10^{-5}\alpha^2 + 0.0043\alpha + 0.5525 \langle \phi nM/\phi dM \langle 4 \times 10^{-5}\alpha^2 + 0.0051\alpha + 0.735$$

It is preferable that the coefficient of linear thermal expansion α is not greater than 0.0001. This is because if the coefficient of linear thermal expansion α increases too much, the part for retaining the optical system will exhibit nonlinear behavior with respect to temperature or the part will cause a defect such as warpage.

Although the present invention has been described with reference to the above exemplary embodiment, the present invention is not limited to this specific embodiment. It is to be understood that modifications and changes may be made to any of the specific configurations without departing from the scope of the appended claims.

For example, in the above exemplary embodiment, the polygon mirror 5 is used as an example of a light deflector. However, a vibrating mirror may be used as the light deflector.

Further, it is not necessary that the scanning lens consists of a single f-theta lens. A plurality of lenses may constitute the scanning lens.

What is claimed is:

1. A scanning optical apparatus comprising: a light source configured to emit a light beam; a light deflector configured to deflect the light beam from the light source in a main scanning direction; an incident optical system disposed between the light source and the light deflector and configured to render the light beam from the light source nearly parallel in the main scanning direction and to converge the light beam in a sub-scanning direction to bring the light beam to a focus in proximity to the light deflector; and a scanning lens configured to focus the light beam deflected by the light deflector onto a target surface to form spot-like images, wherein the incident optical system comprises one or more lenses which provide at least one refracting surface and at least one diffraction surface, and wherein ϕnS/ϕdS<0 is satisfied, where ϕnS is a refractive power in the sub-scanning direction and ϕdS is a diffraction power in the sub-scanning direction;

wherein ϕnM/ϕdM satisfies the following inequality:

$$3 \times 10^{-5}\alpha^2 + 0.0043\alpha + 0.5525 \langle \phi nM/\phi dM \langle 4 \times 10^{-5}\alpha^2 + 0.0051\alpha + 0.735$$

where ϕnM is a refractive power in the main scanning direction in the incident optical system, ϕdM is a diffraction power in the main scanning direction in the incident optical system, and α is a coefficient of linear thermal expansion of a retaining member for retaining a distance between the light source and the incident optical system.

2. The scanning optical apparatus according to claim 1, wherein a lens providing the diffraction surface is made of resin.

3. The scanning optical apparatus according to claim 2, wherein a focus movement relative to the target surface, which is caused by temperature change, is compensated in the main scanning direction and the sub-scanning direction by adjusting values obtained by ϕnM/ϕdM and ϕnS/ϕdS, where ϕnM is a refractive power in the main scanning direction and ϕdM is a diffraction power in the main scanning direction.

4. The scanning optical apparatus according to claim 1, wherein a focus movement relative to the target surface, which is caused by temperature change, is compensated in the main scanning direction and the sub-scanning direction by adjusting values obtained by ϕnM/ϕdM and ϕnS/ϕdS, where ϕnM is a refractive power in the main scanning direction and ϕdM is a diffraction power in the main scanning direction.

5. The scanning optical apparatus according to claim 1, wherein a retaining member for retaining a distance between the light source and the incident optical system has a coefficient of linear thermal expansion a not greater than 0.0001.

6. The scanning optical apparatus according to claim 1, wherein a focus movement relative to the target surface, which is caused by temperature change, is compensated in the main scanning direction and the sub-scanning direction by adjusting values obtained by ϕnM/ϕdM and ϕnS/ϕdS, where ϕnM is a refractive power in the main scanning direction and ϕdM is a diffraction power in the main scanning direction, and wherein when temperature changes in the range of ±30.degree. C., the amount of shift in in-focus position is not greater than 1 mm in the main scanning direction as well as in the sub-scanning direction.

7. The scanning optical apparatus according to claim 1, wherein the incident optical system comprises two lenses which are made of resin.

8. The scanning optical apparatus according to claim 1, wherein the incident optical system comprises one anamorphic lens.

* * * * *

UNITED STATES PATENT AND TRADEMARK OFFICE
CERTIFICATE OF CORRECTION

PATENT NO. : 8,913,313 B2  
APPLICATION NO. : 13/625605  
DATED : December 16, 2014  
INVENTOR(S) : Nakamura et al.

Page 1 of 1

It is certified that error appears in the above-identified patent and that said Letters Patent is hereby corrected as shown below:

In the specification

Column 5, lines 54-55: "$3\times10^{-5}\alpha^2+0.0043\alpha+0.5525(\Box nM/\Box dM(4\times10^{-5}\alpha^2+0.0051\alpha+0.735$" should be -- $3\times10^{-5}\alpha^2+0.0043\alpha+0.5525<\Box nM/\Box dM<4\times10^{-5}\alpha^2+0.0051\alpha+0.735$ --

Column 6, lines 27-28 (claim 1): "$3\times10^{-5}\alpha^2+0.0043\alpha.+0.5525(\Box nM/\Box dM(4\times10^{-5}\alpha^2+0.0051\alpha+0.735$" should be -- $3\times10^{-5}\alpha^2+0.0043\alpha+0.5525<\Box nM/\Box dM<4\times10^{-5}\alpha^2+0.0051\alpha+0.735$ --

Signed and Sealed this  
Third Day of May, 2016

Michelle K. Lee  
*Director of the United States Patent and Trademark Office*